3,109,852
FERROCENE DERIVATIVES
Leslie Albert Day, Macclesfield, England, assignor to Imperial Chemical Industries Limited, Millbank, London, England, a corporation of Great Britain
No Drawing. Filed Dec. 17, 1959, Ser. No. 860,065
Claims priority, application Great Britain Jan. 7, 1959
5 Claims. (Cl. 260—439)

This invention relates to a manufacturing process and more particularly it relates to a process for the manufacture of ferrocene derivatives which are useful as haematinics for the treatment of iron-deficiency anaemia in man and animals.

According to the invention we provide a process for the manufacture of ferrocene derivatives of the formula:

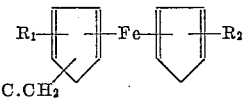

wherein of $R_1$ and $R_2$, one stands for hydrogen and the other stands for a hydrocarbon radical, optionally substituted, which comprises reduction of a compound of the formula:

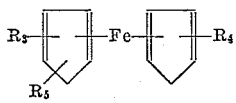

wherein either $R_5$ stands for a pivalyl radical and, of $R_3$ and $R_4$, one stands for hydrogen and the other stands for a hydrocarbon radical, optionally substituted, or $R_5$ stands for a neopentyl radical and, of $R_3$ and $R_4$, one stands for hydrogen and othe other stands for the radical —$COR_6$ wherein $R_6$ stands for a hydrocarbon radical, optionally substituted.

As suitable values of $R_1$ or $R_2$ there may be mentioned, for example, straight- or branched-chain alkyl or cycloalkyl-alkyl radicals, particularly those containing not more than 9 carbon atoms, for example the n-propyl, isobutyl, neopentyl, 3:5:5-trimethylhexyl or hexahydrobenzyl radicals, or phenylalkyl radicals wherein the phenyl radical is unsubstituted or substituted, for example the benzyl, o-chlorobenzyl or β-phenylethyl radical.

The said reduction is preferably carried out by the method known to the art as the Clemmensen reduction process or catalytically in the presence of hydrogen and a hydrogenation catalyst. The process may thus be carried out by use of a suitable reducing agent, for example amalgamated zinc in the presence of aqueous alcoholic hydrochloric acid or a mixture of acetic acid and hydrochloric acid. Other reducing agents which may be used are, for example, hydrogen in the presence of copper chromite using ethanol as solvent or diluent, or hydrogen in the presence of platinum oxide using a solvent or diluent, for example acetic acid. A preferred process is for the manufacture of 1:1'-dineopentylferrocene by reduction of 1-neopentyl-1'-pivalylferrocene according to the Clemmensen process using amalgamated zinc in the presence of aqueous alcoholic hydrochloric acid or a mixture of acetic acid and hydrochloric acid.

The acyl derivatives of ferrocene which are used as starting materials in the process of the present invention may be obtained by the acylation of the corresponding ferrocene derivative.

The compounds which are the products of the process of the invention are new compounds except for the known 1:1'-dineopentylferrocene.

Thus according to a further feature of the invention we provide ferrocene derivatives of the formula:

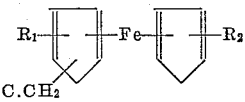

wherein $R_1$ and $R_2$ have the meanings stated above, provided that $R_2$ does not stand for the neopentyl radical.

As particularly valuable ferrocene derivatives there may be mentioned, for example, the compounds 1:3-dineopentylferrocene, 1-isobutyl-1'-neopentylferrocene, 1-isobutyl-3-neopentylferrocene, 1 - o-chlorobenzyl-1'-neopentylferrocene and 1-neopentyl-1'-β-phenylethylferrocene.

The invention is illustrated but not limited by the following examples in which the parts are by weight:

*Example 1*

Amalgamated zinc is prepared from 24 parts of granulated zinc, 2.4 parts of mercuric chloride, 1.4 parts of concentrated aqueous hydrochloric acid and 24 parts of water according to the known art. The supernatant solution is decanted and the zinc amalgam is washed by decantation three times with 30 parts of a hot 2% solution of hydrochloric acid. 50 parts of glacial acetic acid, 84 parts of concentrated aqueous hydrochloric acid and 4 parts of neopentylpivalylferrocene are then added to the zinc amalgam and the reaction mixture is heated under reflux at 90–95° C. for 3 hours with vigorous agitation. A test for completion of reduction consists in chromatography of a small sample on alumina using petroleum ether (B.P. 40–60° C.) as eluant, the absence of a red band denoting complete reduction. The mixture is allowed to cool and the solid cake of dineopentylferrocene formed on the surface is removed. The aqueous phase is extracted with petroleum ether (B.P. 40–60° C.) and the zinc is washed with petroleum ether (B.P. 40–60° C.). The extracts and washings are added to the solid cake of dineopentylferrocene and the solution so obtained is washed with water and dried over sodium sulphate. The solvents are removed by evaporation and there is thus obtained dineopentylferrocene, M.P. 55–59° C. By chromatogaphic separation on alumina this product can be separated into 1:1'-dineopentylferrocene, M.P. 68–69° C., as the main constituent, together with a small amount of 1:3-dineopentylferrocene, M.P. 127° C.

The neopentylpivalylferrocene used as starting material may be obtained as follows:

To a solution of 16.5 parts of aluminium chloride in 63 parts of ethylene dichloride and 38 parts of di-isopropyl ether are added 13 parts of neopentylferrocene and 7 parts of pivalyl chloride. The reaction mixture is kept at 20° C. during 2 hours and is then evaporated to dryness in vacuo. The oily residue is poured on to ice, the mixture is extracted with ether and the ethereal extract is washed successively with dilute sulphuric acid, water and dilute sodium hydroxide solution. It is then dried over anhydrous sodium sulphate and is evaporated to dryness. There is thus obtained neopentylpivalylferrocene.

*Example 2*

40 parts of granulated zinc are amalgamated as described in Example 1 and there are added thereto 84 parts of glacial acetic acid, 163 parts of concentrated aqueous hydrochloric acid and 20 parts of o-chlorobenzoylneopentylferrocene. The mixture is heated under reflux at 90–95° C. for 4½ hours with vigorous stirring. The mixture is poured into water and the residue of zinc is washed with petroleum ether (B.P. 40–60° C.). The aqueous solution is extracted with the said petroleum ether washings, and the organic solution is washed with water until acid-free and then dried. The solution is evaporated to dryness and the residue is purified by chromatographic analysis on alumina. The product is recrystallised from methanol and there is thus obtained 1 - o - chlorobenzyl - 1' - neopentylferrocene, M.P. 57.5–58.5° C.

The o-chlorobenzoylneopentylferrocene used as starting material may be obtained as follows:

16 parts of aluminium chloride are dissolved in 107 parts of anhydrous diethyl ether. To this solution are added 25.6 parts of mononeopentylferrocene, followed by 22.8 parts of o-chlorobenzoyl chloride. The mixture is heated under reflux for 22 hours and is then poured into a mixture of ice and water. The mixture is separated and the aqueous solution is extracted with diethyl ether. The combined ethereal extracts are washed with water until free from acid and then dried. The solution is evaporated and there is thus obtained o-chlorobenzoyl-neopentylferrocene.

*Example 3*

40 parts of granulated zinc are amalgamated as described in Example 1 and there are added thereto 84 parts of glacial acetic acid, 130 parts of concentrated hydrochloric acid and 36.6 parts of hexahydrobenzoylneopentylferrocene. The mixture is heated under reflux at 90–95° C. for 12 hours with vigorous stirring. The products are isolated by a procedure similar to that described in Example 2 and there are thus obtained 1-hexahydrobenzyl-1'-neopentylferrocene, M.P. 37–38° C., and 1 - hexahydrobenzyl - 3 - neopentylferrocene, M.P. 64–66° C.

The hexahydrobenzoylneopentylferrocene used as starting material may be obtained as follows:

51.2 parts of mononeopentylferrocene are dissolved in a solution of 32 parts of aluminium chloride in 214 parts of anhydrous diethyl ether. 35.5 parts of hexahydrobenzoyl chloride are added to this solution and the solution is stirred at room temperature (about 22° C.) for 3 hours. The mixture is poured on to ice and the resultant mixture is separated, both the organic and aqueous solutions being retained. The aqueous solution is extracted with diethyl ether, and the extracts are combined with the said organic solution. The organic solution is washed with water until acid-free and then dried. The solution is evaporated to dryness and there is thus obtained hexahydrobenzoyl neopentylferrocene.

*Example 4*

40 parts of granulated zinc are amalgamated as described in Example 1 and there are added thereto 84 parts of glacial acetic acid, 130 parts of concentrated hydrochloric acid and 20 parts of neopentyl-(3:5:5-trimethylhexanoyl)ferrocene. The mixture is stirred and heated under reflux during 5 hours. The product is isolated by a similar procedure to that described in Example 2 and there is thus obtained 1-neopentyl-3-(3':5':5'-trimethylhexyl)ferrocene, B.P. 134° C./2 mm.

The neopentyl - (3:5:5 - trimethylhexanoyl)ferrocene used as starting material may be obtained as follows:

25.6 parts of mononeopentylferrocene are dissolved in a solution of 16 parts of aluminium chloride in 107 parts of anhydrous diethyl ether. 23 parts of 3:5:5-trimethylhexanoyl chloride are added to this solution, and the solution is stirred at room temperature (about 22° C.) for 16 hours. The mixture is poured on to ice and the resultant mixture is separated, both the organic and aqueous solutions being retained. The aqueous solution is extracted with diethyl ether and the ethereal extracts are combined with the said organic solution. The organic solution is washed with water until acid-free and then dried. The solution is evaporated to dryness and there is thus obtained neopentyl-(3:5:5-trimethylhexanoyl)-ferrocene.

*Example 5*

80 parts of granulated zinc are amalgamated as described in Example 1 and there are added thereto 168 parts of glacial acetic acid, 259.6 parts of concentrated aqueous hydrochloric acid and 20 parts of neopentylphenylacetylferrocene. The mixture is stirred and heated under reflux at 90–95° C. for 2 hours. The product is isolated by a similar procedure to that described in Example 2 and, after recrystallisation from methanol, there is thus obtained 1-($\beta$-phenylethyl)-1'-neopentylferrocene, M.P. 54–54.5° C.

The neopentylphenylacetylferrocene used as starting material may be obtained as follows:

16 parts of aluminium chloride are added to 188 parts of ethylene dichloride, followed by 20 parts of phenylacetyl chloride and 25.6 parts of mononeopentylferrocene. The mixture is stirred at 40–50° C. for 3 hours, and is then poured on to ice. The mixture is separated, both the organic and aqueous solutions being retained, and the aqueous solution is extracted with diethyl ether. The combined etheral extracts are combined with the said organic solution, the combined solution is washed with water until free from acid, and is then dried. The solvents are evaporated and there is thus obtained neopentylphenylacetylferrocene.

*Example 6*

80 parts of granulated zinc are amalgamated as described in Example 1 and there are added thereto 168 parts of glacial acetic acid, 260 parts of concentrated hydrochloric acid and 37.4 parts of $\beta$-phenylethyl-pivalylferrocene. The mixture is stirred and heated under reflux during 5 hours. The product is isolated by a similar procedure to that described in Example 2 and there is thus obtained 1-neopentyl-1'-($\beta$-phenylethyl)ferrocene, M.P. 54–54.5° C.

The $\beta$-phenylethyl-pivalylferrocene used as starting material may be obtained as follows:

10 parts of aluminium powder, 133 parts of phenylacetyl chloride and 124 parts of ferrocene are added to a solution of 106.5 parts of aluminum chloride in 535 parts of anhydrous diethyl ether. The mixture is stirred at room temperature for 18 hours and then poured on to ice. The mixture is separated, the aqueous solution is extracted with diethyl ether and the extracts are combined with the organic solution. The organic solution is washed with water until acid-free and then dried. The solution is evaporated and there is thus obtained crude phenyl-acetylferrocene.

270 parts of granulated zinc are amalgamated as described in Example 1 and there are added thereto 567 parts of glacial acetic acid, 860 parts of concentrated hydrochloric acid and 101 parts of crude phenylacetyl-ferrocene. The mixture is stirred and heated under reflux at 90–95° C. during 3 hours. The product is isolated by a similar procedure to that described in Example 2 and there is thus obtained crude $\beta$-phenylethylferrocene.

40 parts of aluminium chloride are dissolved in 267 parts of anhydrous diethyl ether containing 5 parts of aluminium powder. 72.5 parts of crude $\beta$-phenylethyl-ferrocene and 39.5 parts of pivalyl chloride are added to this mixture. The mixture is stirred at room temperature for 17 hours and then poured on to ice. The mixture is separated, the aqueous solution is extracted with diethyl ether and the extracts and the organic solution are combined. The organic solution is washed with water until acid-free and then dried. The solution is evaporated and there is thus obtained crude β-phenyl-ethyl-pivalyl-ferrocene.

Example 7

160 parts of granulated zinc are amalgamated as described in Example 1 and there are added thereto 336 parts of glacial acetic acid, 520 parts of concentrated hydrochloric acid and 65.2 parts of crude isobutylpivalylferrocene. The mixture is stirred and heated under reflux at 90-95° C. for 5 hours. The products are isolated by a similar procedure to that described in Example 2 and there are thus obtained 1-isobutyl-1'-neopentylferrocene, B.P. 118-122° C./0.5 mm., and 1-isobutyl-3-neopentylferrocene, M.P. 56-57° C.

The crude isobutylpivalylferrocene used as starting material may be obtained as follows:

112 parts of ferrocene and 10 parts of aluminium powder are added to a solution of 106.5 parts of aluminium chloride and 81.5 parts of isobutyryl chloride in 535 parts of anhydrous diethyl ether. The mixture is stirred at room temperature for eighteen hours. The product is isolated in a similar manner to that described in Example 6 for the isolation of crude phenylacetylferrocene. There is thus obtained crude isobutyrylferrocene.

400 parts of granulated zinc are amalgamated as described in Example 1 and there are added thereto 840 parts of glacial acetic acid, 1300 parts of concentrated hydrochloric acid and 128 parts of crude isobutylrylferrocene. The mixture is stirred and heated under reflux for 2 hours. The product is isolated in a similar manner to that described in Example 2 and there is thus obtained crude isobutylferrocene.

6 parts of aluminium powder and 54.5 parts of pivalyl chloride are added to a solution of 56 parts of aluminium chloride and 85 parts of crude isobutylferrocene in 356 parts of anhydrous diethyl ether. The mixture is stirred at room temperature for 20 hours. The product is isolated in a similar manner to that described in Example 6 for the isolation of crude phenylacetylferrocene. There is thus obtained crude isobutylpivalylferrocene.

Example 8

100 parts of granulated zinc are amalgamated as described in Example 1 and there are added thereto 210 parts of glacial acetic acid, 324 parts of concentrated hydrochloric acid and 40.7 parts of crude isobutyrylneopentylferrocene. The mixture is stirred and heated under reflux at 90-95° C. for 5 hours. The products are isolated by a similar procedure to that described in Example 2 and there are thus obtained 1-isobutyl-1'-neopentylferrocene, B.P. 118-122° C./0.5 mm., and 1-isobutyl-3-neopentylferrocene, M.P. 56-57° C.

The crude isobutyrylneopentylferrocene used as starting material may be obtained as follows:

51.2 parts of mononeopentylferrocene are dissolved in 800 parts of methylene dichloride and the solution is cooled to 0° C. A solution of 32 parts of aluminium chloride and 27.6 parts of isobutyryl chloride in 534 parts of methylene dichloride is added to the said solution during 2½ hours, and during the addition the temperature of the mixture is maintained at 0-5° C. When the addition is complete the mixture is stirred for 1¼ hours at 5-10° C., and it is then poured on to ice. The mixture is separated, both organic and aqueous solutions being retained. The aqueous layer is extracted with methylene dichloride. The methylene dichloride extracts are combined with the said organic solution and the combined solutions are then washed with water until free from acid. The organic solution is dried and evaporated and there is thus obtained crude isobutyrylneopentylferrocene.

Example 9

80 parts of granulated zinc are amalgamated as described in Example 1 and there are added thereto 168 parts of glacial acetic acid, 260 part of concentrated hydrochloric acid and 31.2 parts of crude pivalyl-n-propylferrocene. The mixture is stirred and heated under reflux at 90-95° C. for 3 hours. The product is isolated by a similar procedure to that described in Example 2 and there is thus obtained 1-neopentyl-1'-n-propylferrocene, B.P. 125-130° C./1 mm.

The crude pivalyl-n-propylferrocene used as starting material may be obtained as follows:

40 parts of n-propylferrocene, 27.5 parts of pivalyl chloride and 28 parts of aluminium chloride are dissolved in 178 parts of anhydrous diethyl ether containing 2.5 parts of aluminium powder. The mixture is stirred at room temperature for 20 hours. The product is isolated by a similar procedure to that described in Example 6 for the isolation of crude phenylacetylferrocene. There is thus obtained crude pivalyl-n-propylferrocene.

Example 10

68 parts of granulated zinc are amalgamated as described in Example 1 and there are added thereto 142 parts of glacial acetic acid, 222 parts of concentrated hydrochloric acid and 25.1 parts of crude neopentylpropionylferrocene. The mixture is stirred and heated under reflux at 90-95° C. for 19 hours. The product is isolated by a similar procedure to that described in Example 2 and there is thus obtained 1-neopentyl-1'-n-propylferrocene, B.P. 125-130° C./1 mm.

The crude neopentylpropionylferrocene used as starting material may be obtained as follows:

32 parts of aluminium chloride are added to 214 parts of anhydrous diethyl ether, followed by 51.2 parts of mononeopentylferrocene and 4 parts of aluminium powder. The mixture is stirred, 24 parts of propionyl chloride are added and stirring is continued at room temperature for 2 hours. The product is isolated by a similar procedure to that described in Example 6 for the isolation of crude phenylacetylferrocene. There is thus obtained crude neopentylpropionylferrocene.

What we claim is:

1. Ferrocene derivatives of the formula:

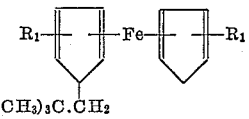

$(CH_3)_3C.CH_2$ wherein one of the $R_1$ substituents is hydrogen and the other is phenyl-alkyl containing not more than 9 carbon atoms.

2. Ferrocene derivatives of the formula:

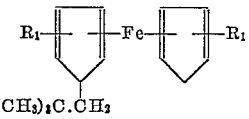

$(CH_3)_3C.CH_2$ wherein one of the $R_1$ substituents is hydrogen and the other is halophenylalkyl containing not more than 9 carbon atoms.

3. Ferrocene derivatives of the formula:

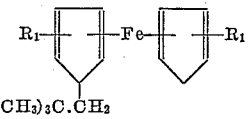

$(CH_3)_3C.CH_2$ wherein one of the $R_1$ substituents is hydrogen and the other is cycloalkylalkyl containing not more than 9 carbon atoms.

4. 1-o-chlorobenzyl-1'-neopentylferrocene.

5. 1-neopentyl-1'-β-phenylethylferrocene.

(References on following page)

References Cited in the file of this patent

UNITED STATES PATENTS

| | | |
|---|---|---|
| 2,763,613 | Scott | Sept. 18, 1956 |
| 2,810,737 | Haven | Oct. 22, 1957 |

FOREIGN PATENTS

| | | |
|---|---|---|
| 763,550 | Great Britain | Dec. 12, 1956 |
| 819,108 | Great Britain | Aug. 26, 1959 |

OTHER REFERENCES

Chemical Abstracts, vol. 52 (1958), p. 7295 (b) and (f).

Organic and Biological Chemistry, June 5, 1957, pages 2741–2746.

Wagner et al.: Synthetic Organic Chemistry, pages 5 and 6 (1953).